June 9, 1936.　　O. B. BRIGGS ET AL　　2,043,576
MACHINE FOR APPLYING BELT FASTENERS
Filed Jan. 30, 1933　　4 Sheets-Sheet 4
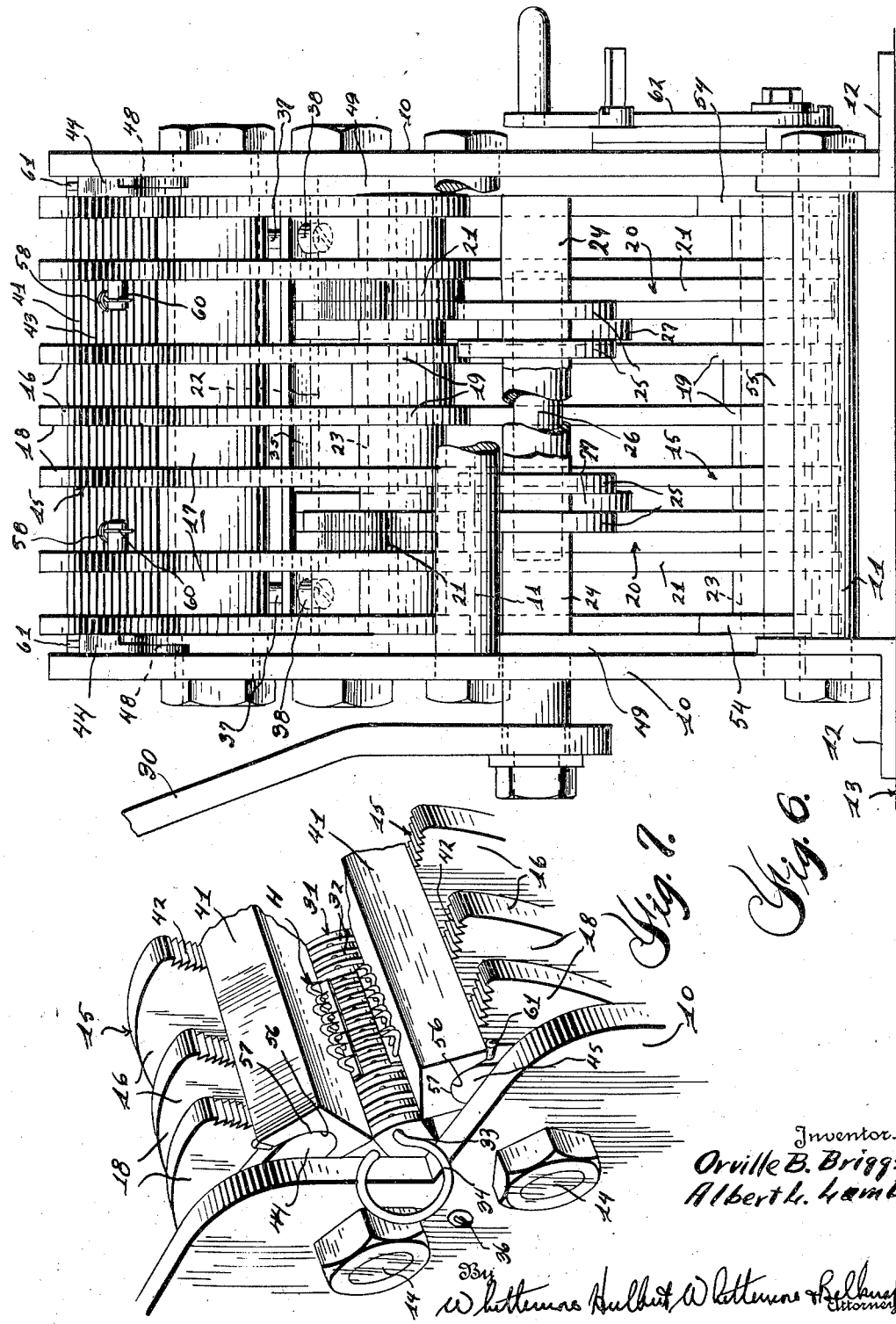

Patented June 9, 1936

2,043,576

UNITED STATES PATENT OFFICE 2,043,576

MACHINE FOR APPLYING BELT FASTENERS

Orville B. Briggs and Albert L. Lamb, Toledo, Ohio, assignors to Safety Belt-Lacer Company, Toledo, Ohio, a corporation of Delaware Application January 30, 1933, Serial No. 654,352

16 Claims. (Cl. 1—49.4)

This invention relates to a machine for applying belt fasteners or belt hooks to the ends of belts, and has for its objects to simplify, render more efficient, and improve generally devices of this character.

One of the objects of this invention is to provide a machine of this character which is readily adjustable to accommodate belt hooks or fasteners of various sizes.

Another object of the invention is to provide a belt fastener applying machine of this nature in which a force adequate to properly apply the hooks to the belt may be obtained with the application of a minimum amount of force or power.

Another object of the invention is to provide a device of this character in which the power applied to the jaws is progressively increased so as to obtain the maximum jaw pressure when the jaws are acting to clinch the belt hooks into the belt, this progressively increasing pressure being obtained from the application of a constant power effort on the operating or power shaft of the machine.

Other objects of the invention are to provide a simple construction which is strong and durable and which may be economically manufactured and assembled with facility.

The several objects, advantages and novel details of construction of this invention will be made more apparent as this description proceeds, especially when considered in connection with the accompanying drawings, wherein Figure 1 is a perspective view of a belt fastener applying machine constructed in accordance with this invention;

Figure 5 is a fragmentary sectional view taken substantially on the plane indicated by line 5—5 of Figure 2 looking in the direction of the arrows;

Figure 6 is a rear elevational view of the device, certain of the parts being broken away;

Figure 7 is a fragmentary perspective view showing the jaws in open position;

Figure 8 is a fragmentary longitudinal sectional view through the two ends of a continuous belt showing the belt hooks or fasteners in place, and Figure 9 is a plan view of the structure illustrated in Figure 8.

Figure 1:
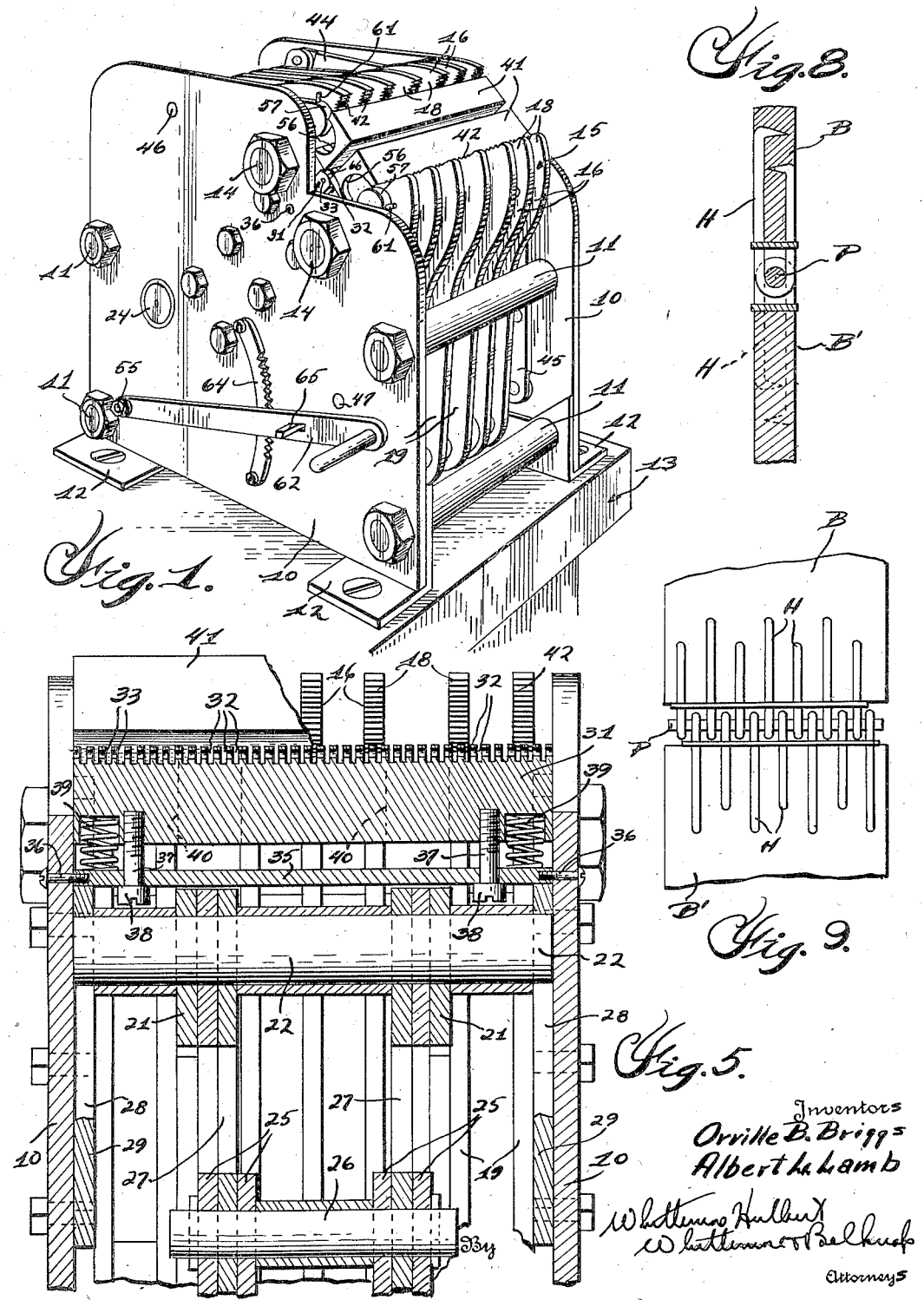

Referring now more particularly to the drawings, it will be noted that the device comprises a frame consisting of a pair of side plates 10 held in spaced parallel relation by means of a plurality of cross members or rods 11. Feet 12 are provided, secured to the side plates 10, by means of which the machine may be secured to a support 13 or the like.

The problem involved is that of connecting the ends B and B' of a continuous belt, and for accomplishing this strips or gangs of belt hooks or fasteners H are secured to the belt ends so that the looped ends of the belt hooks may be connected by means of a pin P.

Extending transversely between the side plates 10 and fixed thereto are two rods 14 which constitute fixed pivots upon which a pair of jaw supports 15 are rockably mounted. Each jaw support 15 preferably consists of a plurality of separate plate-like elements or members 16 spaced longitudinally of their respective shafts 14 by means of sleeves 17 arranged therebetween.

The jaw supports 15 are provided at points adjacent the pivots 14 with jaw supporting faces or portions 18 and with extended opposite ends 19 for a powerful leverage in a manner yet to be referred to.

The ends 19 of the jaw supporting members 15 are connected by one or more sets of toggle links 20 each comprising a pair of toggle members 21 pivotally interconnected by means of a rod or shaft 22, and having their free ends pivotally connected respectively to the ends 19 of the jaw supports by means of rods 23.

The toggle members are actuated through the medium of an actuating or power shaft 24 rotatably journaled in the side plates 10, this operating shaft being provided with a crank or lever 25 pivotally connected as at 26 to a link 27 which in turn is pivotally connected to the rod 22 forming the pivot at the junction of the toggle members. Preferably there are two sets of toggle members, and thus two sets of levers 25 and links 27, the pivot rod 26 extending between the two levers 25 and links 27 to tie these members together for simultaneous operation.

Figure 3:
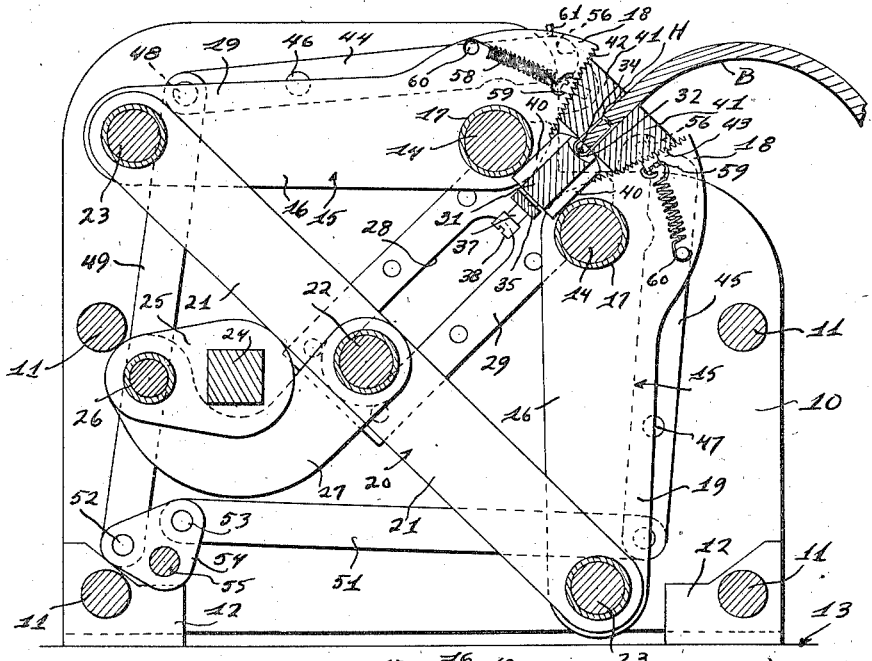
Figure 3 is a similar view with the parts in the other extreme position, that is with the jaws closed.
Figure 4:
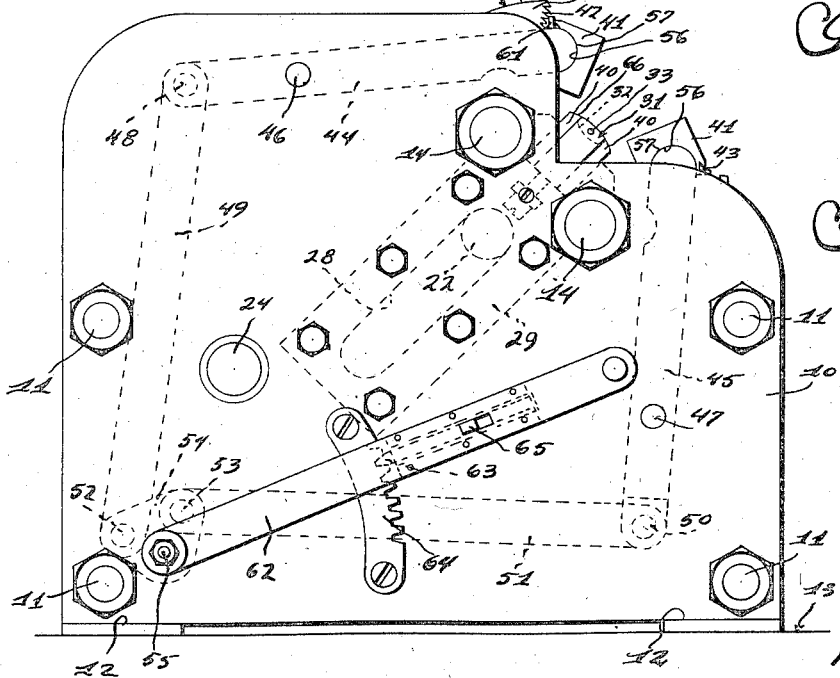
Figure 4 is a side elevational view of the device.

The junction pivot rod 22 of the toggle links is caused to travel in a straight path by means of guide slots 28 formed in guide plates 29 secured to the inner faces of the side plates 10, the ends of the rod 22 working in these slots, see particularly Figures 3 and 5. The length of the guide slots 28 governs the extent of the movement of the toggle links in both directions, and consequently the extent of movement of the jaw supporting members 15.

The operating shaft 24 extends beyond one of the side plates and has attached thereto an operating handle 30.

The longitudinal axis of the guide slots 28 intersects the angle formed by the opposed faces of the jaw supporting members 15, and arranged in this intersecting line or plane is a fastener holder 31. This fastener holder is in the form of a block provided with a plurality of transverse slots 32 adapted to be engaged respectively by the loops of a gang or strip of the belt hooks H. A longitudinally extending opening 33 is provided through which a pin 34 may be inserted after a gang or strip of hooks has been placed in the fastener holder to prevent the accidental removal of the hooks or fasteners during the attaching operation.

Figure 2:
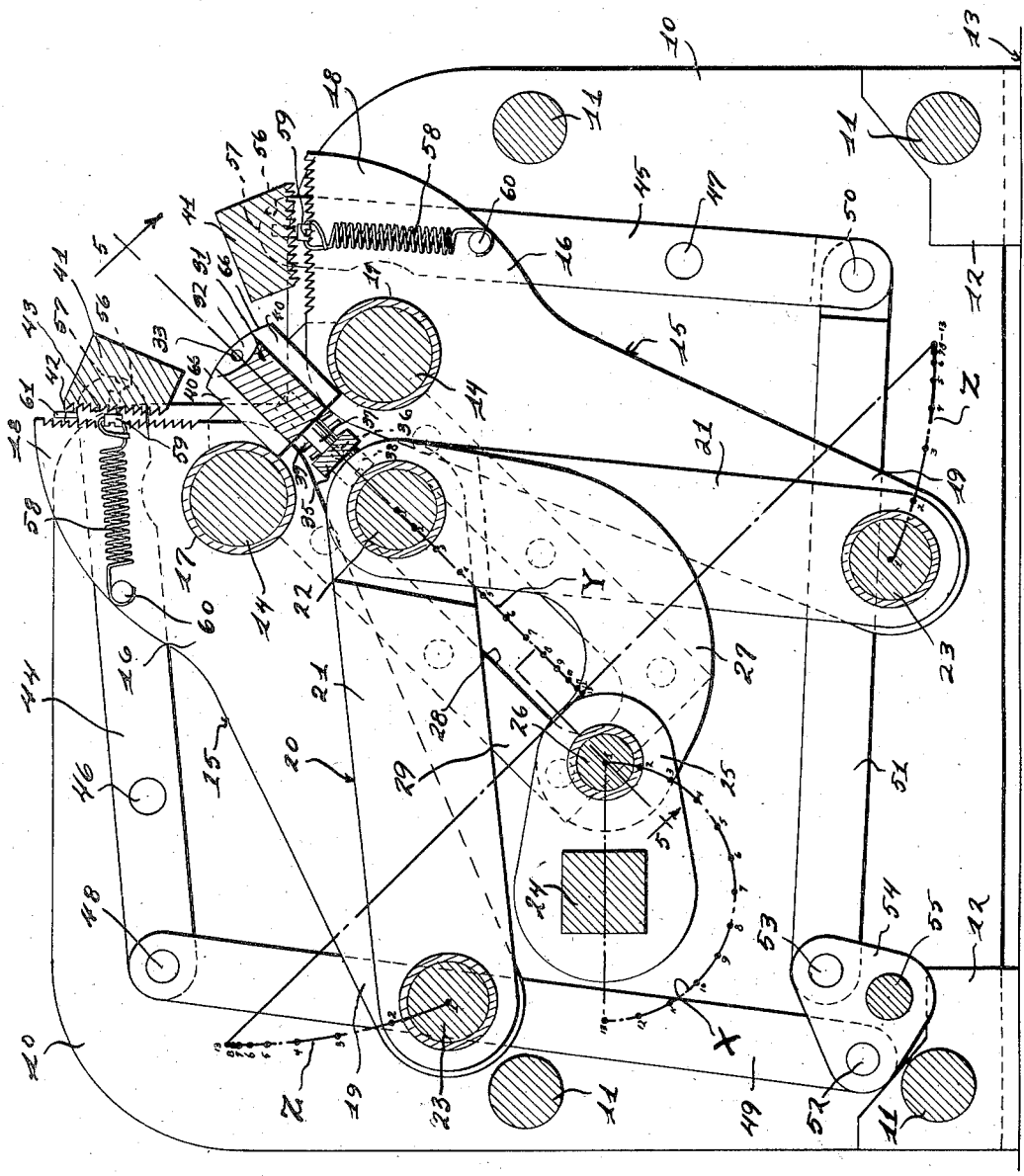
Figure 2 is an enlarged vertical sectional view through the machine.

The fastener holder is mounted for reciprocable movement in the said plane which intersects the angle of the opposed faces of the jaw supports, and for this purpose there is provided a fastener support 35 in the form of a plate which extends between the side plates 10 and is secured thereto by fastening means 36, see more particularly Figure 5. The fastener holder 31 is secured to the support 35 by means of studs 37 which pass through the support 35 and are fixed to the fastener holder as, for instance, by being threaded therein. These studs are provided with heads 38 which limit the movement of the fastener holder away from the supporting plate, springs 39 being provided for normally maintaining the fastener holder in its uppermost position, such as illustrated in Figures 2 and 5. The fastener holder is provided with plates 40 on the opposite longitudinal sides thereof, the upper edges of which are arc-shaped and form continuations of the upper transverse arced surface of the fastener holder. The arc-shaped faces of these plates, together with the upper face of the fastener holder, are adapted to be engaged by the jaw members, yet to be referred to, during the operation of the machine to force the fastener holder downwardly against the action of the spring 39 as the belt hooks are bent and secured to the belt. However, when the jaws are again moved apart, the springs 39 return the fastener holder to the position illustrated in Figures 2 and 5.

In order to accommodate the machine to belts of different thicknesses which consequently require belt hooks or fasteners of different size, a pair of movable jaws 41 are adjustably mounted with respect to the jaw supporting members 15.

The jaws 41 are in the form of elongated blocks which extend transversely of the jaw supporting portions of the members 16. The jaw supporting face of each of these members 16 is serrated, as at 42, or is otherwise provided with alternate projections and recesses for engagement with a similarly shaped face 43 of the jaw 41. Thus when the jaws 41 have been adjusted relatively to the jaw supporting faces of the jaw supports, and have been engaged therewith, accidental relative movement between the jaws and their supports is prevented.

Mounted on the inner face of each of the side plates 10 is a pair of jaw adjusting members 44 and 45 respectively. Each jaw adjusting member 44 is pivotally mounted intermediate its ends, as at 46, to adjacent side plate 10, whereas the other companion jaw adjusting member 45 is pivotally mounted, as at 47 on the adjacent side plate 10. One end of the member 44 is pivotally connected, as at 48, to an operating link 49 whereas the end of the jaw adjusting member 45 is pivotally connected as at 50 to an operating link 51. These links 49 and 51 are pivotally connected respectively at 52 and 53 to a lever plate 54 which is fixed to a jaw adjusting shaft 55, this shaft extending between the side plates 10 and being rotatably journaled thereon.

It will be understood that the system of jaw adjusting levers and links just described is duplicated at each side of the machine so that two of the adjusting levers 44 are provided for the upper jaw member 41 and two of the adjusting levers 45 for the lower jaw member 41.

Therefore, each of the jaw members 41 is provided at both ends thereof with a substantially semi-circular recess 56 with which the semi-circular or rounded end 57 of the corresponding operating lever 44 or 45 engages.

The jaws 41 are held either in engagement with their respective adjusting levers 44 and 45 or with the jaw supporting faces of the jaw supports by means of springs 58 connected at one end as at 59 to the jaws and anchored at the other end as at 60 to the adjacent element or member 16 of the jaw supporting members. The position of the points of attachment 59 of the springs 58 to the jaws 41 is closer to one longitudinal edge of the jaw member than the other longitudinal edge so that the springs normally tend to rotate the jaw members about the curved end faces 57 of the jaw adjusting levers 44 and 45. This holds the jaw against stop pins 61 fixed to the respective jaw adjusting levers 44 and 45 and thus holds the jaw members 41 in position whereupon the serrated faces 43 thereof will engage the serrated faces 42 of the jaw supports.

The jaw adjusting shaft 55 extends beyond one of the side plates and has attached thereto a jaw adjusting lever 62. This lever 62 is provided with a pawl 63 working in a rack 64, the pawl being normally spring pressed by a spring (not shown) so as to normally engage the rack, but being retractable by a finger piece 65.

When the jaw supports are not in their open or separated position, the jaws 41 are supported upon their respective adjusting levers 44 and 45. This is the position of the parts illustrated in Figures 2 and 7. With the parts in this position, the jaw adjusting lever 62 may be operated to thus rotate the lever plate 54 and through the links 49 and 51 to rock the jaw adjusting levers 44 and 45 about their respective pivots 46 and 47. This will cause a movement of the jaws 41 either toward or away from one another in a plane substantially parallel to the angularly disposed planes of the jaw supporting faces of the jaw supports and thus position the jaws either nearer to or further from the pivots 14 and the fastener holder 31 to accordingly accommodate belt hooks or fasteners of different sizes.

After the jaws have been thus adjusted, the jaw adjusting lever 62 is released and will be held in position by the pawl and rack 63—64. The operating lever 30 may then be actuated to rotate shaft 64 which, through the medium of the lever 25 and links 27, will actuate the toggle links to straighten the same. These toggle links acting against the long ends 19 of the jaw supporting members 15 will rock these jaw supporting members around their fixed pivots 14. As the opposed faces of these jaw supporting members move toward one another they will engage the opposed faces of the jaws 41 and will first move these jaws off of these adjusting levers 44—45 and then continued movement of the jaw supports will move the jaws to closed position. This position is illustrated in Figures 1 and 3.

From these two figures, it will be apparent that the jaws have been entirely separated from their adjusting members and the entire thrust of the jaws is taken up by the jaw supports. As the operating lever 30 is subsequently returned to its original position, the jaws 41 are again moved apart and when they approach the ends of the adjusting levers 44—45, the recesses 56 thereof again engage the rounded ends 57 of the levers 44—45 whereupon further separating movement of the jaws is arrested and the jaw supports continue to move further to the position illustrated in Figure 2 whereupon the jaws are again in position to be adjusted relative to the jaw supporting members.

In Figure 2 there is graphically illustrated the movement of the parts which accomplishes the power increase during the latter part of the closing movement of the jaws.

On the arc X there is illustrated and designated by the numbers 1 to 13 the travel of the pivotal connection 26 between the lever or crank 25 and link 27. This movement has been divided into uniform increments representing a uniform movement of the power or operating shaft 24 by means of the handle 30. On the line Y the movement of the junction pivot 22 of the toggle links has been indicated by similar numbers, it being apparent, however, that the increments of movement decrease as the junction pivot 22 approaches the position where the toggles are straightened. In a like manner, on the arc Z the movement of the pivots 23 between the ends of the toggle links and the jaw supports is indicated. The increments of movement designated by the corresponding numbers 1 to 13 indicate that at the beginning of the straightening movement of the toggles, the movement of the jaw supports and consequently of the jaws is greater, this movement gradually decreasing as the toggle links reach their straightened position.

This graphically illustrates that with a given or constant application of force on the operating shaft 24 the last portion of the movement of the toggles as they approach their straightened position is utilized to apply the greatest pressure upon the jaw supports and consequently the jaws to clinch and imbed the belt hooks into the belt, this portion of the operation, in practice, necessitating the greatest amount of pressure.

As the jaws 40 approach one another in moving to closed position, the lower edges thereof engage the upper arc-shaped surfaces 66 of the plates 40 and move the fastener holder downwardly or inwardly in a plane which intersects the angle between the two opposed faces of the jaws. In the continued movement of the jaws toward closed position the lower faces of these jaws ride over the arc-shaped ends of the plates 40 and onto the arc-shaped face of the fastener holder, still further depressing the fastener holder against the action of the springs 39. This movement draws the strip or bank of hooks or fasteners downwardly as the jaws close to thus produce a substantially semi-circular loop at the bend of the hooks so that these loops may properly receive and accommodate the round pins P which are used in fastening the belt ends together.

While the construction which has hereinbefore been described somewhat in detail has been found in practice to give entirely satisfactory results, nevertheless it will be immediately apparent to those skilled in this art that various changes in many of the essential and all of the non-essential details of construction may be resorted to without departing from the spirit and scope of this invention, and to this end reservation is made to make such changes as may come within the purview of the accompanying claims.

What we claim as our invention is:

1. In a device of the class described, the combination with a pair of jaw supports rockably journaled on fixed pivots, of jaw members, and means for uniformly simultaneously adjusting said jaw members with respect to their respective jaw supports.

2. In a device of the class described, the combination with a pair of jaw supports rockably journaled on fixed pivots, of jaw members, and means for simultaneously adjusting said jaw members relative to said jaw supports toward and away from the pivots thereof.

3. In a device of the class described, a pair of jaw supports having diverging jaw supporting faces, a pair of jaw members, and means for simultaneously adjusting said jaw members relative to said diverging supporting faces.

4. In a device of the class described, a pair of jaw supports having jaw supporting faces arranged in diverging planes, a pair of jaw members, and means for adjusting said jaw members toward and away from one another relative to and in the same direction along said supporting faces.

5. In a device of the class described, a pair of jaw supports having diverging jaw supporting faces, a pair of jaw members, means normally urging said jaw members into engagement with said jaw supporting faces, and means for holding said jaw members spaced from said jaw supporting faces and for adjusting said jaw members along said diverging supporting faces.

6. In a device of the class described, a pair of jaw supports having diverging jaw supporting faces, a pair of jaw members, mating portions on said jaw supporting faces and jaws to prevent relative movement therebetween when said jaws are in engagement with said jaw supporting faces, means urging said jaws into engagement with said jaw supporting faces, and means for disengaging said jaws from said jaw supports and for adjusting the same relative to said diverging jaw supporting faces.

7. In a device of the class described, a jaw support having a jaw supporting face, a pivot upon which said jaw support is rockably mounted, a jaw member, and jaw adjusting means engageable with said jaw member during the open position of said jaw support for adjusting said jaw member with respect to and along said jaw supporting face.

8. In a device of the class described, a pair of jaw supports rockably mounted on fixed pivots and having diverging jaw supporting faces, a pair of jaw members, and jaw adjusting means engageable with said jaws during the open position of said jaw supports for adjusting said jaws along said jaw supporting faces.

9. In a device of the class described, a rockably mounted jaw support, a jaw member associated therewith, means urging said jaw member into engagement with said jaw support, a rockably mounted jaw adjusting member operatively engaging said jaw in one position of said jaw support, and means for rocking said jaw adjusting member to move said jaw with respect to said jaw support.

10. In a device of the class described, a pair of side frame members, a jaw support rockably mounted thereon, a jaw member associated with said jaw support, means urging said jaw member into engagement with said jaw support, a pair of jaw adjusting members pivotally supported on said side frame members, one end of each of said jaw adjusting members operatively engaging said jaw member during one position of said jaw support, and means for engaging the opposite ends of said jaw adjusting members for rocking the same about their pivots to adjust said jaw members with respect to said jaw supports.

11. In a device of the class described, a pair of pivotally mounted jaw supports provided with extensions located at one side of said pivots, jaw members associated with said jaw supports, toggle linkage connecting said extensions, means including a crank, and a link pivotally connecting the crank to the toggle linkage for actuating said toggle linkage to rock said jaw supports.

12. In a device of the class described, a pair of pivotally mounted jaw supports provided with extensions located at one side of said pivots, jaw members associated with said jaw supports, toggle linkage connecting said extensions, an actuating shaft, a crank on said shaft, and a link connecting said crank to said toggle linkage for actuating the latter to rock said jaw supports.

13. In a device of the class described, a pair of pivotally mounted jaw supports provided with extensions located at one side of said pivots, jaw members associated with said jaw supports, toggle linkage connecting said extensions, an actuating shaft, a lever fixed to said shaft, a link pivotally connected to said lever and to said toggle linkage at the juncture of the toggle links for actuating said links to rock said jaw supports, and a guide for the junction pivot of said toggle linkage.

14. In a device of the class described, a pair of pivotally mounted jaw supports provided with extensions at one side of the pivots, jaws associated with said jaw supports and mounted for adjustment with respect thereto, toggle links having their free ends pivotally connected respectively to said extensions, guiding means, and means located at the juncture of said toggle links operating in said guiding means for guiding and limiting the movement of the toggle links.

15. In a device of the class described, a pair of jaw supports removably mounted on fixed pivots and provided with extensions at one side of the pivots, means for actuating the jaw supports including toggle links having the adjacent ends pivotally connected together and having the free ends thereof pivotally connected respectively to the extensions, means for guiding the movement of the links at the juncture thereof, and jaws associated with the supports and mounted for adjustment along the supports relative to the pivotally interconnected ends of the toggle links.

16. In a device of the class described, a pair of reciprocably mounted jaw supports, jaw members associated therewith, means connecting the jaw supports including toggle links having the inner ends pivotally interconnected and having their outer ends respectively pivotally connected to the jaw supports, means guiding the pivotally interconnected ends of the links throughout a fixed predetermined path of travel, means operatively connected to the pivotally interconnected ends of the links for moving the same along the guiding means including a crank, and a link pivotally connecting the crank to the inner ends of the toggle links.

ORVILLE B. BRIGGS.
ALBERT L. LAMB.